Jan. 12, 1937.   R. HAFNER   2,067,633
ROTATIVE WING AIRCRAFT
Filed July 27, 1935
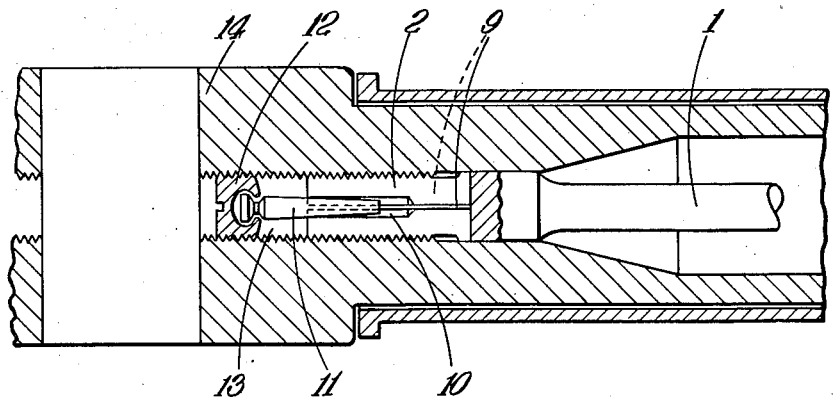
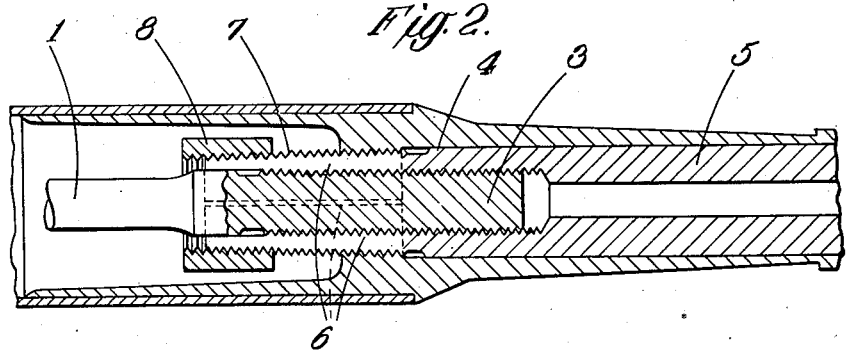
Raoul Hafner
INVENTOR
his ATTY.

Patented Jan. 12, 1937

2,067,633

UNITED STATES PATENT OFFICE 2,067,633

ROTATIVE WING AIRCRAFT

Raoul Hafner, Vienna, Austria

Application July 27, 1935, Serial No. 33,465
In Great Britain December 12, 1934

4 Claims. (Cl. 244—39)

This invention relates to rotative wing aircraft, that is to say aircraft comprising a system of supporting surfaces or blades rotative about a vertical or approximately vertical axis, usually termed windmill planes and helicopters.

It is an improvement in or modification of that set forth in British patent, application No. 23,645/33 according to which each blade of a helicopter or windmill plane is connected, at a point intermediate its ends, to the hub by a torsionally flexible radial tension member to eliminate friction in adjusting the angle of the blade.

In such machines, particularly of the type known as windmill machines, the tension member provides a considerable stabilizing torque if it can be fixed at some neutral position (such as the auto-rotating angle) and therefore tends to return to this position when the blade has been turned to some other angle by means of the control directing the aircraft. It is, however, essential that the means for fixing the said blade shall be capable of taking a considerable torsional load without slipping and that the said fixing means shall occupy only a small space to be capable of being accommodated within a tubular spar carrying the blade.

According to the invention each blade is connected, at a point intermediate its ends, to the hub by a torsionally flexible radial tension member, means being provided for fixing the ends of the said tension member in any adjusted position so that the torsional load on the said tension member acts as a restoring couple to the said blade.

The ends of the torsionally flexible member may be provided with male threads which engage corresponding female threads in the hub or blade and either the said threaded ends or the corresponding portions of the hub or blade may be split so that, by means of axially tapered devices, the male and female threads may be forced into engagement, thereby locking the torsionally flexible member in adjusted position.

An example of construction according to the invention applied to aircraft of the kind set forth in British patent, application No. 31,300/33 is described with reference to the accompanying drawing wherein:—

Figure 1 shows a vertical cross section of the root of a blade and inner end of the torsionally flexible member.

Figure 2 shows a corresponding cross sectional view of the outer end of the torsionally flexible member.

The torsionally flexible member 1 is provided with screw-threaded ends 2, 3. The outer threaded end 3 is screwed into a corresponding screw-threaded portion 4 of the blade 5 which is split longitudinally by saw cuts 6 and is provided on its outer surface with a male thread 7 on which is threaded a lock nut 8. Either the lock nut 8 or the screwed portion 7 or both may be tapered so that the split portion 4 may be wedged together on to the threaded end 3 by tightening up the lock nut 8.

The inner threaded end 2 of the member 1 is split with a longitudinal saw cut 9 and drilled with an axial hole 10 which may be either parallel or tapered and into which a suitable taper pin 11 may be driven. This pin 11 may be swivelled in a plug screw 12 which is adapted to screw into a threaded hole 13 in the blade knuckle 14. The end 2 of the torsionally flexible member is threaded into the hole 14.

When it is in adjusted position the plug screw 12 is tightened up forcing the plug 11 into the hole 10 and thereby wedging the split ends 2 of the torsionally flexible member against the sides of the hole 13.

In a modification the hole 10 may be threaded and the taper pin 11 may be provided with a corresponding thread by which it is screwed into place.

It will be understood that the invention is applicable to all types of rotating wing aircraft although it is particularly applicable to such machines having blades of the kind described in British patent, application No. 31,300/33.

What I claim and desire to secure by Letters Patent of the United States is:—

1. A rotative wing for aircraft, including a rotary hub, a plurality of variable-pitch sustaining blades radiating therefrom, torsionally resilient tie means anchoring each blade to said hub and torsionally stressed by pitch changes thereof, and means for angularly adjusting either end of said tie means to adjust the pitch angle at which its resilience tends to maintain said blade.

2. A rotative wing for aircraft, including a rotary hub, a plurality of variable-pitch sustaining blades radiating therefrom, torsionally resilient radial tie means anchoring each blade, at a point intermediate in its length, to said hub and torsionally stressed by pitch changes thereof, and means for angularly adjusting either end of said tie means to adjust the pitch angle at which its resilience tends to maintain said blade.

3. A rotative wing for aircraft, including a rotary hub, a plurality of variable pitch hollow sustaining blades radiating therefrom, a torsionally resilient radial tie member, extending within each blade to anchor it, at a point intermediate in its length, to said hub and torsionally stressed by pitch changes thereof, and means for angularly adjusting either end of said tie member to adjust the pitch angle at which its resilience tends to maintain said blade.

4. A rotary wing for aircraft as claimed in claim 3 wherein an end of said tie member is provided with a male screwthread engaging in a female screwthread carried by said blade or hub, one of said screwthreads being axially split for co-operation with an axially movable and tapered locking member.

RAOUL HAFNER.